United States Patent
Sharma et al.

(10) Patent No.: US 7,765,194 B1
(45) Date of Patent: Jul. 27, 2010

(54) DETECTION AND ENFORCEMENT OF VERSION COMPATIBILITY IN NETWORK DEVICES

(75) Inventors: Samar Sharma, San Jose, CA (US); Arindam Paul, Sunnyvale, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 352 days.

(21) Appl. No.: 11/378,991

(22) Filed: Mar. 17, 2006

(51) Int. Cl.
G06F 17/00 (2006.01)
(52) U.S. Cl. ...................................................... 707/695
(58) Field of Classification Search .............. 707/1, 707/9, 10, 101, 102, 201, 203, 204; 709/220, 709/238, 249; 713/150; 716/5; 717/170, 717/173, 174
See application file for complete search history.

(56) References Cited

U.S. PATENT DOCUMENTS

| | | | | |
|---|---|---|---|---|
| 6,069,895 A | * | 5/2000 | Ayandeh | 370/399 |
| 6,898,768 B1 | * | 5/2005 | Theodossy et al. | 716/5 |
| 7,373,500 B2 | * | 5/2008 | Ramelson et al. | 713/150 |
| 2005/0034115 A1 | * | 2/2005 | Carter et al. | 717/173 |
| 2005/0262522 A1 | * | 11/2005 | Gassoway | 719/331 |

OTHER PUBLICATIONS

Cisco IPS 4200 Series Sensors, Intrusion Detection System Compatibility Matrix, Doc. ID: 4638, printed from www.cisco.com/en/US/products/hw/vpndevc/ps4077/products_tech_note09186a . . . on Jul. 14, 2006, 8 pages.
Shawn Bodily, IBM Techdocs Technote: "HACMP Version Compatibility Matrix," Doc ID: TD101347, printed from www-03.ibm.com/support/techdocs/atsmastr.nsf/webindex/TD101347 on Jul. 14, 2006, 2 pages.

* cited by examiner

*Primary Examiner*—Apu M Mofiz
*Assistant Examiner*—Anteneh Girma
(74) *Attorney, Agent, or Firm*—Weaver Austin Villeneuve & Sampson LLP (57) ABSTRACT

Methods and apparatus are provided for detecting and maintaining version compatibility in network devices. Interfaces associated with network devices and components are controlled in order to generate compatibility information at compile time. Version compatibility information embedded in image headers is checked during installation. Version compatibility information is also used to generate access control lists. Access control lists prevent incompatible device communication during run time.

29 Claims, 9 Drawing Sheets

| Switch A 301 |
|---|
| Supervisor (v0) 303 |
| Line Card 1 (v1) 305 |
| Line Card 2 (v2) 307 |

| Switch B 311 |
|---|
| Supervisor (v0') 313 |
| Line Card 1 (v1') 315 |
| Line Card 2 (v2') 317 |

| Version Compatibility Matrix 321 | |
|---|---|
| v0 | v1 |
| v0 | v2 |
| v0' | v1' |
| v0' | v2' |
| v1 | v1' |

Figure 4

| Source Resource Graph 401 | |
|---|---|
| Image Type 403 (Image Version 405) | Image Type 407 (Image Version 409) |
| Supervisor 411 (Version 4.2.0) | Intelligent Line Card Vendor Image 431 (Version 1.2.1) |
| Supervisor 413 (Version 4.2.0) | Intelligent Line Card Storage Vendor Image 433 (Version 3.1.2) |
| Supervisor 415 (Version 4.3.0) | Intelligent Line Card Vendor Image 435 (Version 1.3.1) |
| Supervisor 417 (Version 4.3.0) | Intelligent Line Card Storage Vendor Image 437 (Version 3.1.3) |
| Intelligent Line Card Vendor Image 421 (Version 1.2.1) | Intelligent Line Card Vendor Image 423 (Version 1.3.1) |

DETECTION AND ENFORCEMENT OF VERSION COMPATIBILITY IN NETWORK DEVICES

BACKGROUND OF THE INVENTION

1. Field of the Invention

The present invention generally relates to network devices. More specifically, the present invention provides techniques and mechanisms for detecting and maintaining version compatibility for images associated with network devices.

2. Description of Related Art

Version compatibility issues associated with network devices are numerous. Networks can include hundreds of interconnected switches, routers, and gateways and each switch, router, and gateway can include a number of different line cards, supervisors, and other components. Each device or component may support different features, protocols and may originate from different vendors and suppliers. Furthermore, each device or component may include multiple software images that may originate from different vendors. Upgrades and patches of various devices and components occur rather frequently, and ensuring version compatibility upon upgrading or patching a particular device or component is administratively inefficient and error prone.

Running incompatible images in a network can lead to loss of data, data corruption, or other unpredictable behavior. Current techniques for maintaining or detecting version compatibility are limited. Consequently, it is desirable to provide improved techniques for detecting and maintaining version compatibility in network devices.

SUMMARY OF THE INVENTION

Methods and apparatus are provided for detecting and maintaining version compatibility in network devices. Interfaces associated with network devices and components are controlled in order to generate compatibility information at compile time. Version compatibility information embedded in image headers is checked during installation. Version compatibility information is also used to generate access control lists. Access control lists prevent incompatible device communication during run time.

A technique for performing version compatibility checking is provided. Prior version interface files associated with a prior version code base are identified. Updated version interface files associated with an updated version code base are identified. Tokens associated with the prior version interface files and tokens associated with updated version interface files are identified. Compatibility between the prior version code base and the updated version code base is confirmed upon determining that the tokens associated with the prior version interface files correspond to tokens associated with updated version interface files.

In another embodiment, a system for performing version compatibility checking is provided. The system includes an interface and a processor. The interface is operable to receive prior version interface files associated with a prior version code base and receive updated version interface files associated with an updated version code base. The processor is operable to identify tokens associated with the prior version interface files and tokens associated with updated version interface files and confirm compatibility between the prior version code base and the updated version code base upon determining that the tokens associated with the prior version interface files correspond to tokens associated with updated version interface files.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of storage network devices and line cards. However, it should be noted that the techniques of the present invention can be applied to a variety of different network devices and components. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. In addition, a block of data is described in several contexts. A block of data may include multiple data blocks or data sets.

Network devices include a variety of devices and components that run different firmware or software images from numerous vendors. For example, a fibre channel switch can include multiple supervisors, multiple fibre channel line cards, and multiple Internet Protocol (IP) line cards. Some line cards may require several images, such as software or firmware images, from different vendors. In one example, a fibre channel line card uses a standard line card image from the line card vendor and an intelligent line card image from a third party vendor. In some instances, features may need to be periodically added to various devices and components or other patches and updates have to be made to existing images. For example, a line card may need to support a new field or an additional message format or a flaw may have to be fixed. Consequently, updated images are provided periodically by vendors and installed onto network devices and components by network administrators.

However, it is extremely difficult to ensure that an updated version of an image will be compatible with existing images in line cards and supervisors in a switch and compatible with existing images in other devices and components in other switches, hosts, and appliances. A network may include hundreds of interconnected switches, routers, and other devices. Maintaining compatibility information and ensuring that updates do not adversely impact system performance is an administratively inefficient and ineffective.

Consequently, the techniques of the present invention allow efficient compatibility checking at compile time, install time, and run time. Interfaces between images are controlled to allow generation of compatibility information at compile time. Compatibility information is included in image headers to allow efficient compatibility checking at install time. Access control lists (ACLs) are generated using compatibility information to prevent incompatible images from communicating during run time. The ACLs allow only traffic between line cards and appliances that are running compatible images. Adverse or otherwise unpredictable network behavior resulting from communication between incompatible images is prevented.

Figure 1:
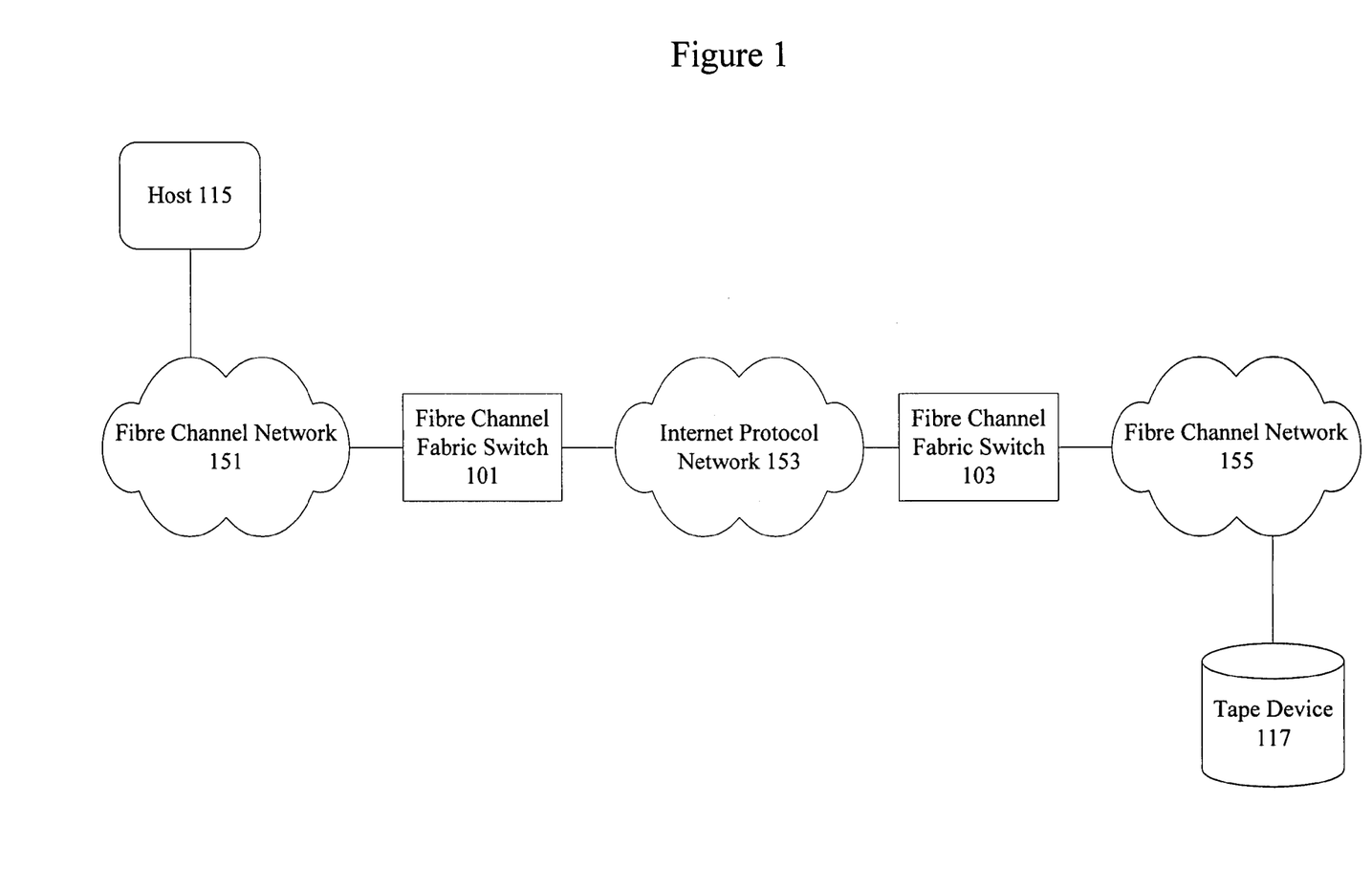
FIG. 1 is a diagrammatic representation showing a system that can use the techniques of the present invention.

FIG. 1 is a diagrammatic representation showing one example of a system that can use the techniques of the present invention. Although the techniques of the present invention will be described in this example in the context of fibre channel switches having storage and IP line cards, it should be recognized that the techniques of the present invention are applicable to a variety of protocols, network devices, cards, appliances, and systems. In one example, multiple fibre channel networks are often interconnected through widely available Internet protocol (IP) networks such as the Internet. In one example, the switches may also be connected to Internet Small Computer Systems Interface (iSCSI) networks. Each fibre channel network and IP network may include numerous devices having a range of images from different vendors. For example, fibre channel network 151 is connected to Internet protocol network 153 using a fibre channel fabric switch 101.

In one example, switch 101 is a host end switch and switch 103 is a tape device end switch. The fibre channel fabric switch 101 includes a fibre channel interface as well as an Internet protocol interface. Fibre channel network 155 is also connected to Internet protocol network 153 through a fibre channel fabric switch 103. The fibre channel fabric switch 103 also includes a fibre channel network interface and an Internet protocol interface. The host 115 is connected to fibre channel network 151 and target storage device 117 such as a tape device or disk array is connected to fibre channel network 155.

Switch 101 and switch 103 include cards and components such as supervisors and line cards. A variety of images may be installed on switches 101 and 103. Some images include kickstart images, system images, add-on images, and bundled images. A kickstart image is an image used at boot time. A kickstart image is distinct from the supervisor image. A system image is an image running on the supervisor. An add-on image is an image that is not bundled with the supervisor image. One example of an add-on image is an intelligent line card image. A bundled image is an image that is part of the supervisor image. For example, a standard line card image and a vendor image is a bundled image. A control path processor or control path plane (CPP) image can be a bundled image that is part of a supervisor image A CPP image can also be an add-on image such as an intelligent line card image. Add-on images can reside on supervisor flash devices or on control path processor flash devices included on a line card. Line cards themselves include components such as data path processors and control path processors. Line cards themselves can be standard line cards or intelligent line cards having data snooping and data processing capabilities.

Figure 2:
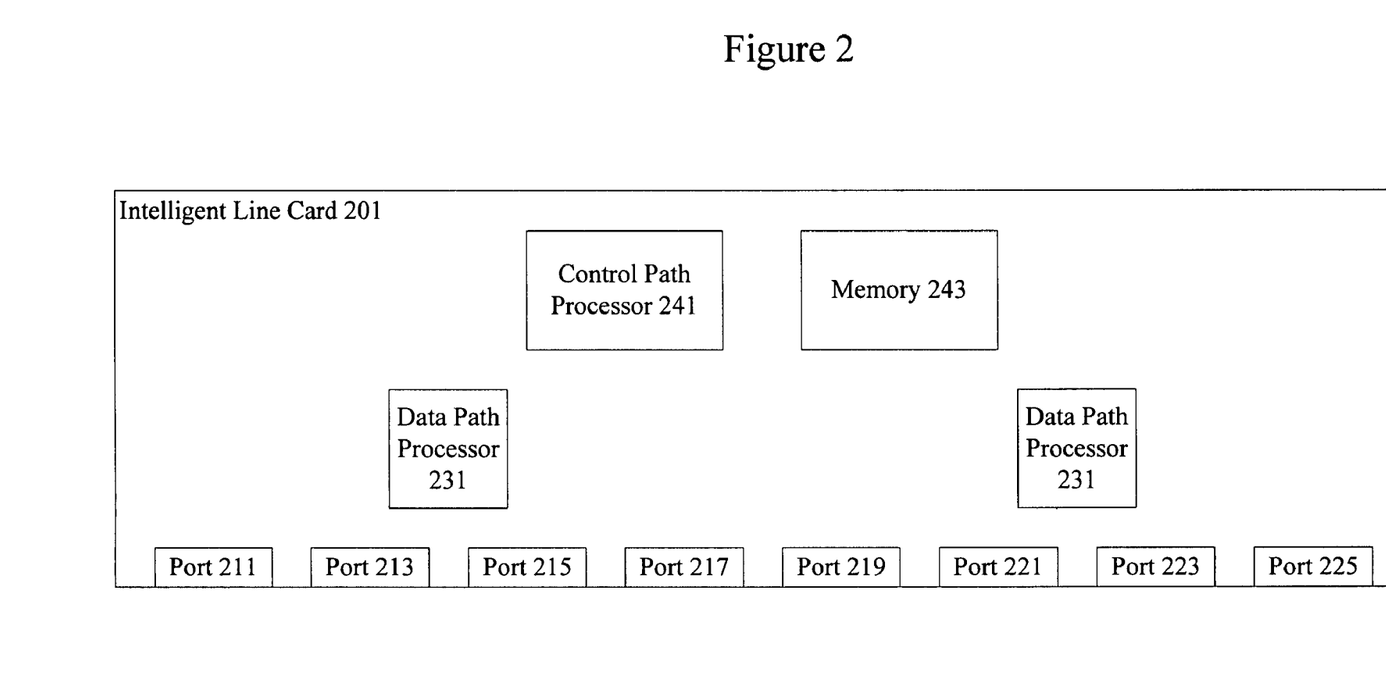
FIG. 2 is a diagrammatic representation showing an intelligent line card.

FIG. 2 is a diagrammatic representation showing one example of an intelligent line card. According to various embodiments, the intelligent line card includes ports 211-225, data path processors 231 and 233, control path processor 241, and memory 243. Data path processors 231 and 233 are used to identify flow information and exchange information and output the data to the appropriate switch port. The control path processor 241 is used to handle management functions and exceptions. Memory 243 can be used to hold statistical data gathered by a data path processor. In one embodiment, eight data path processors are provided for 32 ports.

Although separate data path and control path processors are provided, it should be noted that in some instances, a single processor may be used to handle network traffic and control functions and exceptions. In many instances, multiple images are loaded onto an intelligent line card, although in some instances a single image can be provided. In other examples, additional processors may be provided. Any line card having hardware support for packet snooping and processing is referred to herein as an intelligent line card.

Figure 3:
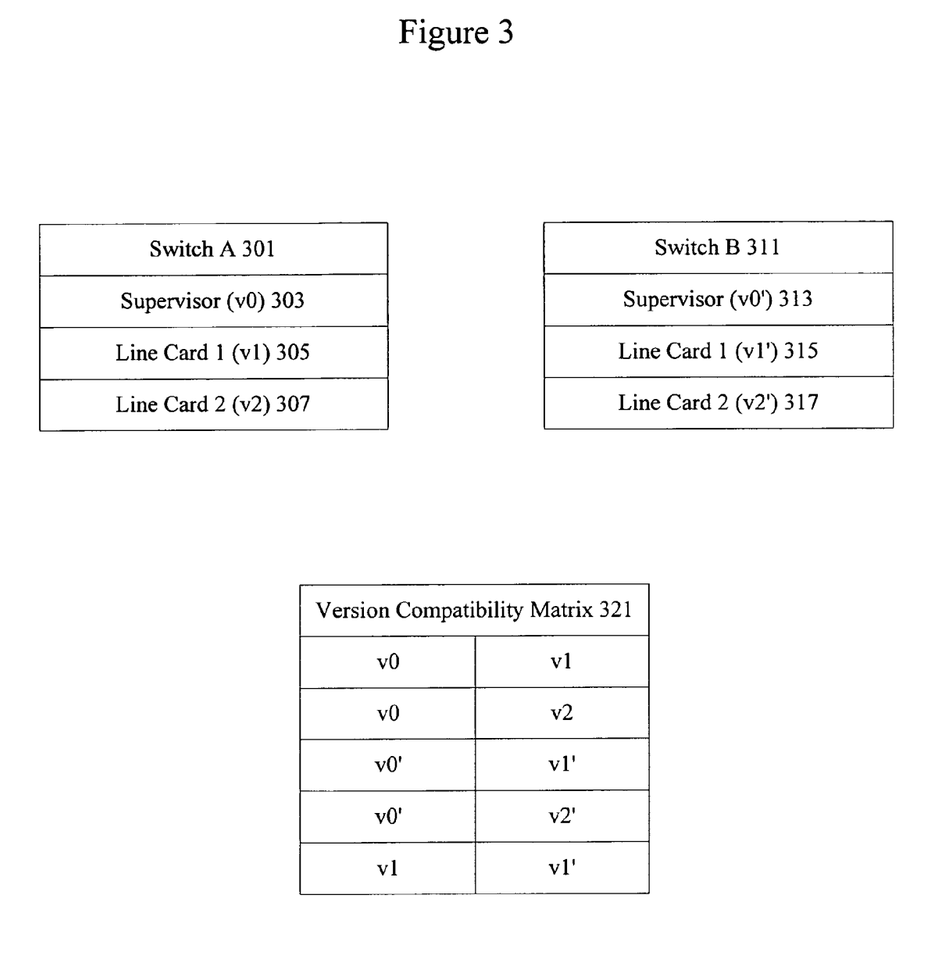
FIG. 3 is a diagrammatic representation showing a version compatibility matrix.

Line cards and supervisors on a switch have one or more images having corresponding version numbers. The line cards can maintain information to allow runtime enforcement of communication to ensure image compatibility. FIG. 3 is a diagrammatic representation showing multiple switches 301 and 311. Switch A 301 has a supervisor (running version v0) 303, a line card (running version v1) 305, and another line card (running version v2) 307. Switch B 311 has a supervisor (running version v0') 313, a line card (running version v1') 315, and another line card (running version v2') 317. A version compatibility matrix 321 shows v0 compatible with v1. v0 is also compatible with v2. v0' is compatible with v1' and v0' is also compatible with v2'. v1 is compatible with v1'. However, v2 is not compatible with v2'. According to various embodiments, a negative access control list (ACL) entry is created to deny communications between the intelligent line card (running version v2) 307 and the intelligent line card (running version v2') 317. If communications between the intelligent line card (running version v2) 307 and the intelligent line card (running version v2') 317 were allowed, unpredictable behavior could result.

The techniques of the present invention recognize that access control lists provide a convenient mechanism for ensuring that only compatible devices communicate. According to various embodiments, ACLs are used to block data transfers. For example, ACLs can be used to block IP packets from being forwarded by a router. In one instance, ACLs apply filtering to non-fragments and the initial fragment of an IP packet because they contain both Layer 3 and 4 information that the ACLs can match against for a permit or deny decision. Non-initial fragments are traditionally allowed through the ACL because they can be blocked based on Layer 3 information in the packets. However, because these packets do not contain Layer 4 information, they do not match the Layer 4 information in the ACL entry, if it exists. Allowing the non-initial fragments of an IP datagram through is acceptable because the host receiving the fragments is not able to reassemble the original IP datagram without the initial fragment.

According to various embodiments, the version compatibility matrix is configured by using the most recent compatibility information available to a network device. In one example, compatibility information is made available from an external server. However, in another example, compatibility information is provided in the header of an image update. The image header format is used by vendors and suppliers of various software and firmware images. According to various embodiments, the image header format is controlled and common to all image providers. A generic library can be used to parse the image header.

Figure 4:
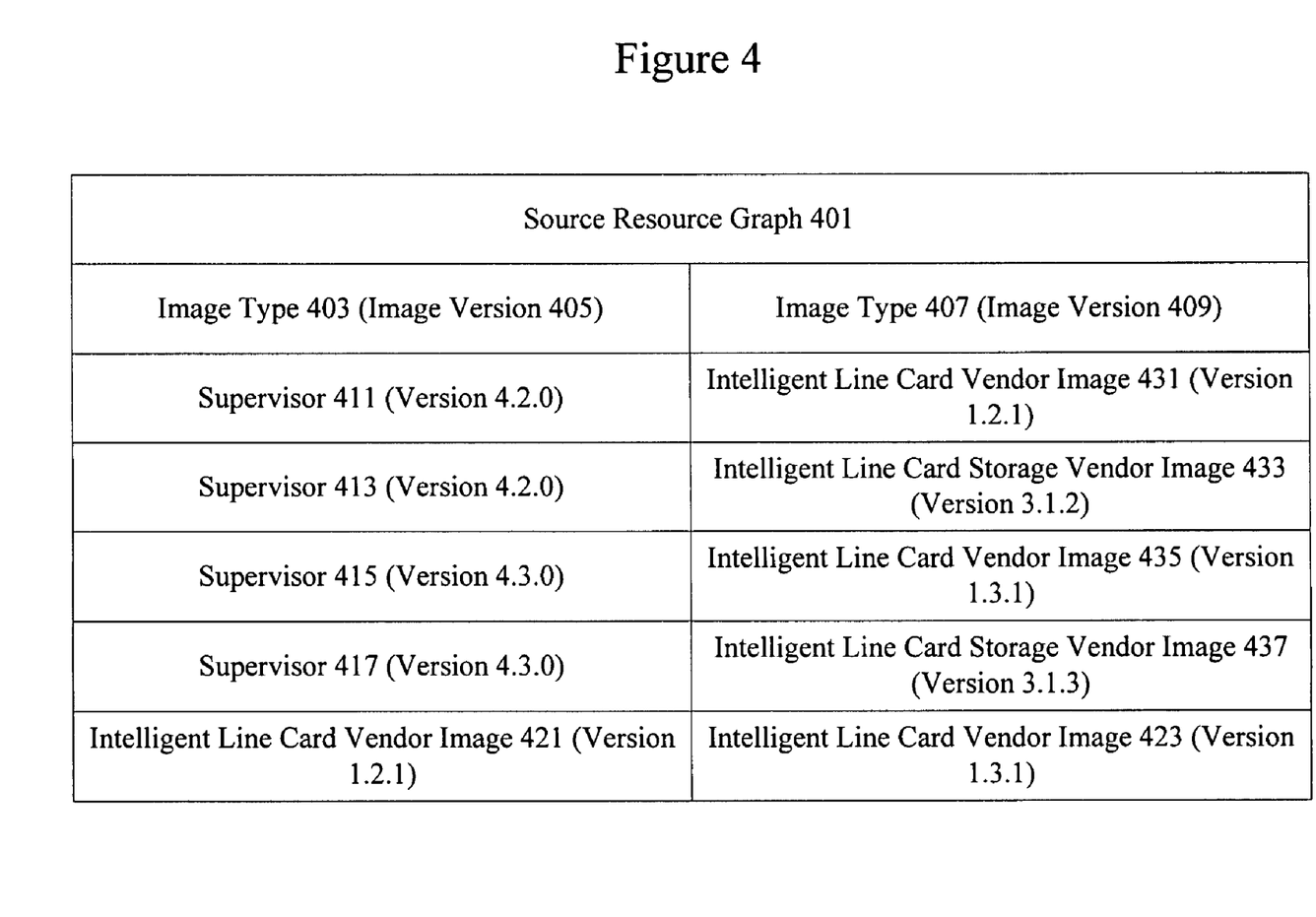
FIG. 4 is a diagrammatic representation showing a source resource graph.

FIG. 4 is a diagrammatic representation of a source resource graph or software relationship graph (SRG) that can be used to provide compatibility information in an image header. According to various embodiments, a source resource graph 401 includes image type 403 and image version 405 fields and a corresponding compatible image type 407 image version 409. For example, supervisor 411 has an image version 4.2.0. The supervisor 411 image version 4.2.0 is compatible with intelligent line card vendor image 431 version 1.2.1. A single line card may run images from multiple vendors. The supervisor 413 running version 4.2.0 is also compatible with intelligent line card storage vendor image 433 version 3.1.2. Consequently, communications are allowed between a supervisor and an intelligent line card having fully compatible images.

A supervisor 415 running version 4.3.0 is compatible with intelligent line card vendor image 435 version 1.3.1. Supervisor 417 running version 4.3.0 is compatible with intelligent line card storage vendor image 437 version 3.1.3. Information is also provided about compatibility between line card versions. For example, intelligent line card vendor image 421 version 1.2.1 is compatible with intelligent line card vendor image 423 version 1.3.1.

According to various embodiments, a source resource graph or a software relationship graph specifies the version and properties for firmware or software of a particular image and the relationship to other images. In one example, the SRG file includes the following:

main {
timestamp=$$time_futone; # A progressive number . . . .
train_timestamp=2;
software_id=$$swid_isan;;
interim_version="1.3(0.9)";
version="1.3(1)";
};
software_id $$swid_isan {
switchover_interchangeable {
"1.0(3)", "1.0(3a)", "1.0(3b)", "1.0(4)", "1.0(5)","1.1(1)", "1.1(2)", "1.1(1a)", "1.2(1)";
};
startupconfig_interchangeable {
"1.0(3)", "1.0(3a)", "1.0(3b)", "1.0(4)", "1.0(5)","1.1(1)", "1.1(2)", "1.1(1a)", "1.2(1)";
};
};
The file also specifies additional version compatibility information. It should be noted that a wide variety of information can be included. Typically, an SRG file include image type and image version information.

software_id $$swid_ks {
compatible {
"1.3(1)";
};
};
software_id $$swid_slc {
compatible {
"1.2(1)", "1.0(3)", "1.0(3a)", "1.0(3b)", "1.0(4)", "1.0(5)","1.1(1)", "1.1(2)", "1.1(1a)",
"1.3(1)";
};
};compatible
"1.3(1)";
};
};
software_id $$swid_slc {
compatible {
"1.2(1)", "1.0(3)", "1.0(3a)", "1.0(3b)", "1.0(4)", "1.0(5)","1.1(1)", "1.1(2)", "1.1(1a)",
"1.3(1)";
};
};

According to various embodiments, supervisors are responsible for upgrading images. In some examples, active and standby supervisors are also responsible for upgrading supervisor images.

Figure 5:
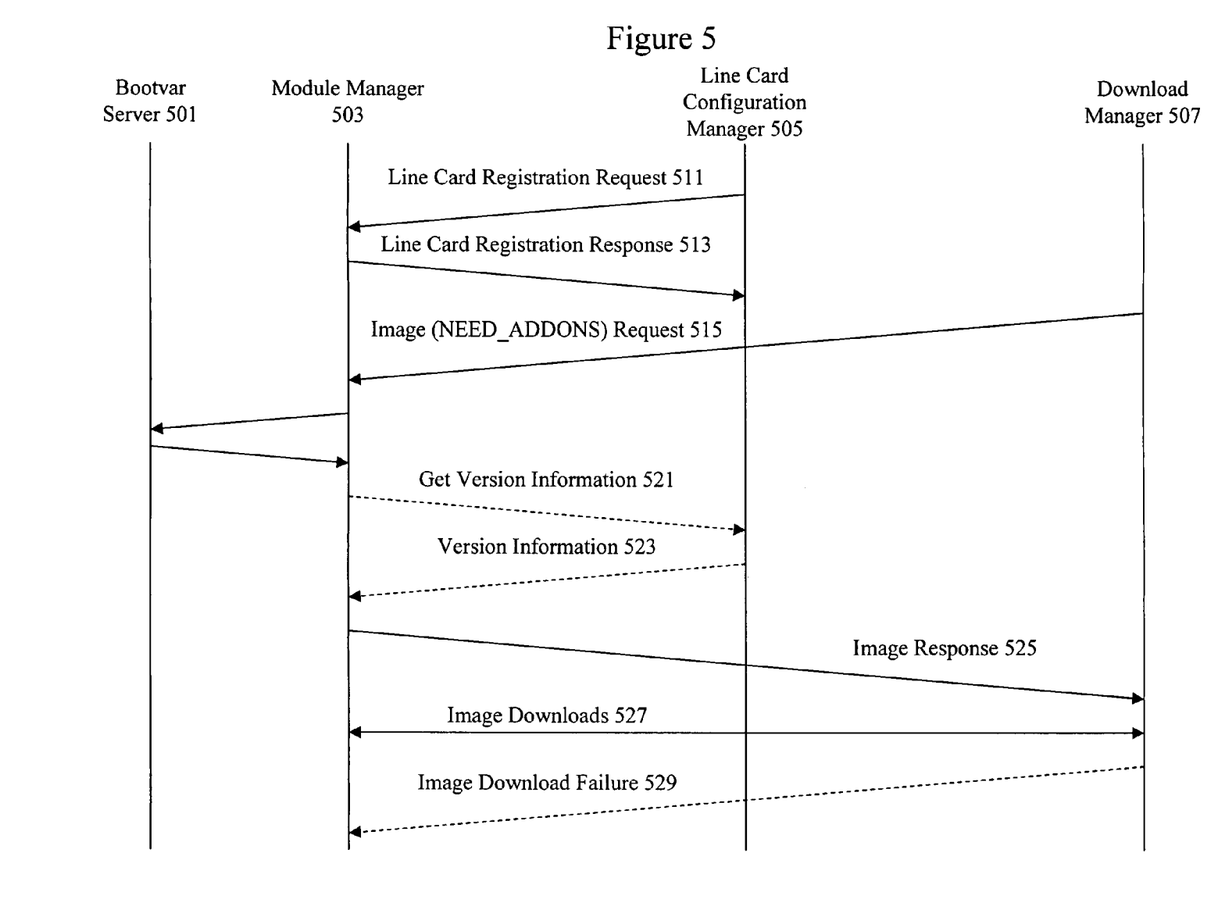
FIG. 5 is an exchange diagram showing a technique for performing install time checking.

FIG. 5 is an exchange diagram showing components associated with a line card image update. According to various embodiments, a line card is associated with a module manager 503 that maintains module specific information and performs add on image version compatibility checks. In some examples, the line card has access to a bootvar server 501 that maintains locations of images for various components. The line card configuration manager 505 downloads registration information and handles version requests from the module manager. The download manager 507 sends requests for image updates, obtains image updates and extracts them. It should be noted that a line card can also include a variety of other components or may not have one of the above mentioned components.

According to various embodiments, a download manager 505 sends a line card registration request 511 to a module manager 503. The module manager 503 responds with a line card registration response 513. A download manager 507 sends an image request message to the module manager 503. According to various embodiments, the download manager 507 sends a NEED_ADDONs message to the module manager 503. The module manager maintains image record information to keep information about images that are used by a given module. For example, a standard line card may require a standard line card image. An intelligent line card may require a standard line card image and an intelligent line card image. The module manager 503 sends a request to the bootvar server 501 to determine the location of the needed image.

If the image is on the supervisor, then the module manager can obtain the version information directly. Otherwise, the module manager 503 may need to get the version information from the line card. Consequently, the module manager 503 sends an optional get version information message 521 to the line card configuration manager 505. The line card configuration manager 505 responds with version information 523. According to various embodiments, a validity check is performed on the image. A compatibility check can also be performed using a source resource graph or a software relationship graph. If incompatibility is detected, the line card is powered off. If the image version is compatible, the module manager 503 sends an image response 525 to the download manager 507. The image response 525 may include a list of images to be downloaded. The download manager 507 downloads the images at 527. According to various embodiments, update images are downloaded to the supervisor bootflash or directly to the line card flash from the network. If a download fails, an image download failure message is sent at 529.

A supervisor image can also be updated in a similar manner. In one example, a system includes an active supervisor and a standby supervisor. To update a supervisor image, a module manager gets an upgrade notification. The module manager then checks if a line card needs to be power-cycled for all the line cards present. This is determined by verifying the supervisor image's compatibility with image version from the line cards. The module manager then sends a get image request to the line card configuration manager to get the needed version information. The line card configuration managers sends a get image version response to the module manager.

According to various embodiments, the module manager does the following for each get image version response message from the line card configuration manager. If the image version information is not present in the get image version response message, then the line card is powered off. Otherwise, the image version information is checked to determine compatibility. If an image for the line card is not compatible with the new supervisor and the image is part of the new supervisor image, then power-cycle of the line card and a break from the loop are triggered. When the line card restarts, the line card can proceed to obtain new compatible images using line card update mechanisms. The supervisor can then perform a switch over.

Although run time checking and install time checking can be performed, it is recognized that additional checks can also be performed at compile time. The techniques of the present invention recognize unique characteristics associated with network devices and components. For example, network switches include numerous line cards each configured with images from a variety of vendors. Although interfaces are diverse, a subset of interfaces can be controlled to maintain compatibility across images. For examples, network devices typically communicate using packet exchange between line cards and function calls between images. In one example, a switch includes multiple supervisors and multiple intelligent line cards. Each intelligent line card includes a standard line card image and multiple intelligent line card images. The intelligent line card images and the standard line card image communicate with each other using function calls. The intelligent line card images and the standard line card image communicate with the supervisor using message transfers or packet transfers.

Figure 6:
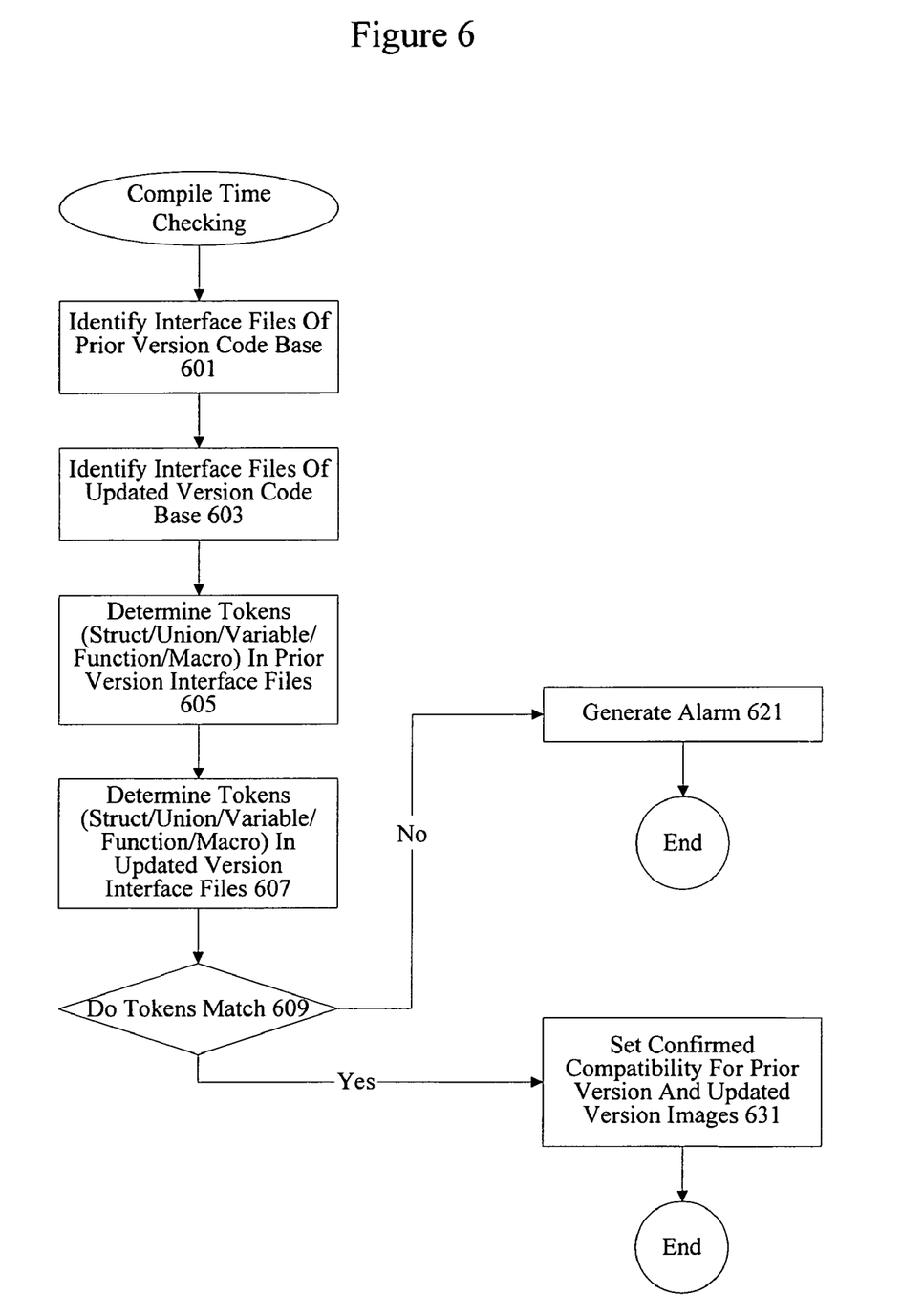
FIG. 6 is a flow process diagram showing compile time checking.

FIG. 6 is a flow process diagram showing compile time checking to ensure image version compatibility. At 601, interface files associated with a prior version code base are identified. At 603, interface files of the updated version code base are identified. At 605, tokens in prior version interface files are determined. According to various embodiments, tokens include structures, unions, variables, functions, and macros. At 607, tokens in updated version of the interface files are determined. At 609, it is determined if tokens match. If tokens do not match at 609, an alarm is generated at 621. Otherwise, compatibility is confirmed for prior version and updated version images.

Figure 7:
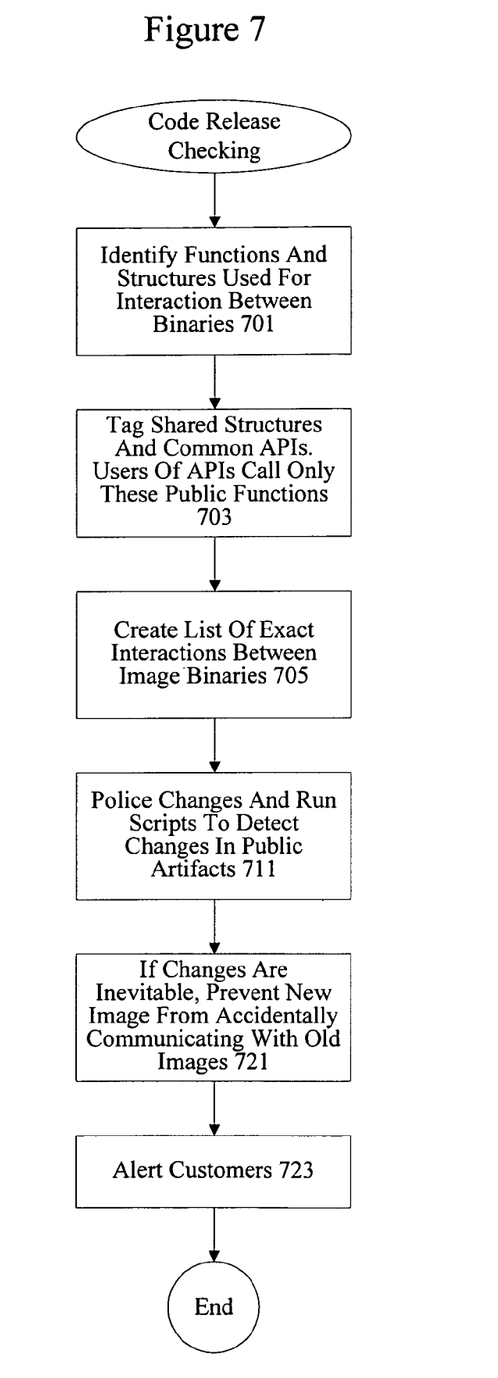
FIG. 7 is a flow process diagram showing code release checking.

FIG. 7 is a flow process diagram showing an embodiment for performing code checking. At 701, functions and structures used for interaction between binaries are identified. According to various embodiments, at 703, shared structures are tagged with a keyword such as public_struction or PUBLIC_struct and common APIs are tagged with a keyword such as public_function or PUBLIC_fn. In some examples, the tags are recursive. Any nested structure in a PUBLIC_struct will also be a PUBLIC_struct. In typical implementations, consumers of library APIs call only these PUBLIC functions. Messages sent and received across images are in PUBLIC format. At 705, a list of exact interactions between image binaries is created.

According to various embodiments, all identified APIs and messages found are frozen. In one example, all are included in a single directory. All producers of such artifacts should be educated that other existing binaries from older releases might be using them and therefore they should be careful not to include changes that would make new releases incompatible with older binaries. Scripts are run at 711 to detect changes in public artifacts. If such changes must be made at 721, then all involved parties should be alerted to a flag day after which older binaries will become incompatible at 721 and 723.

Figure 8:
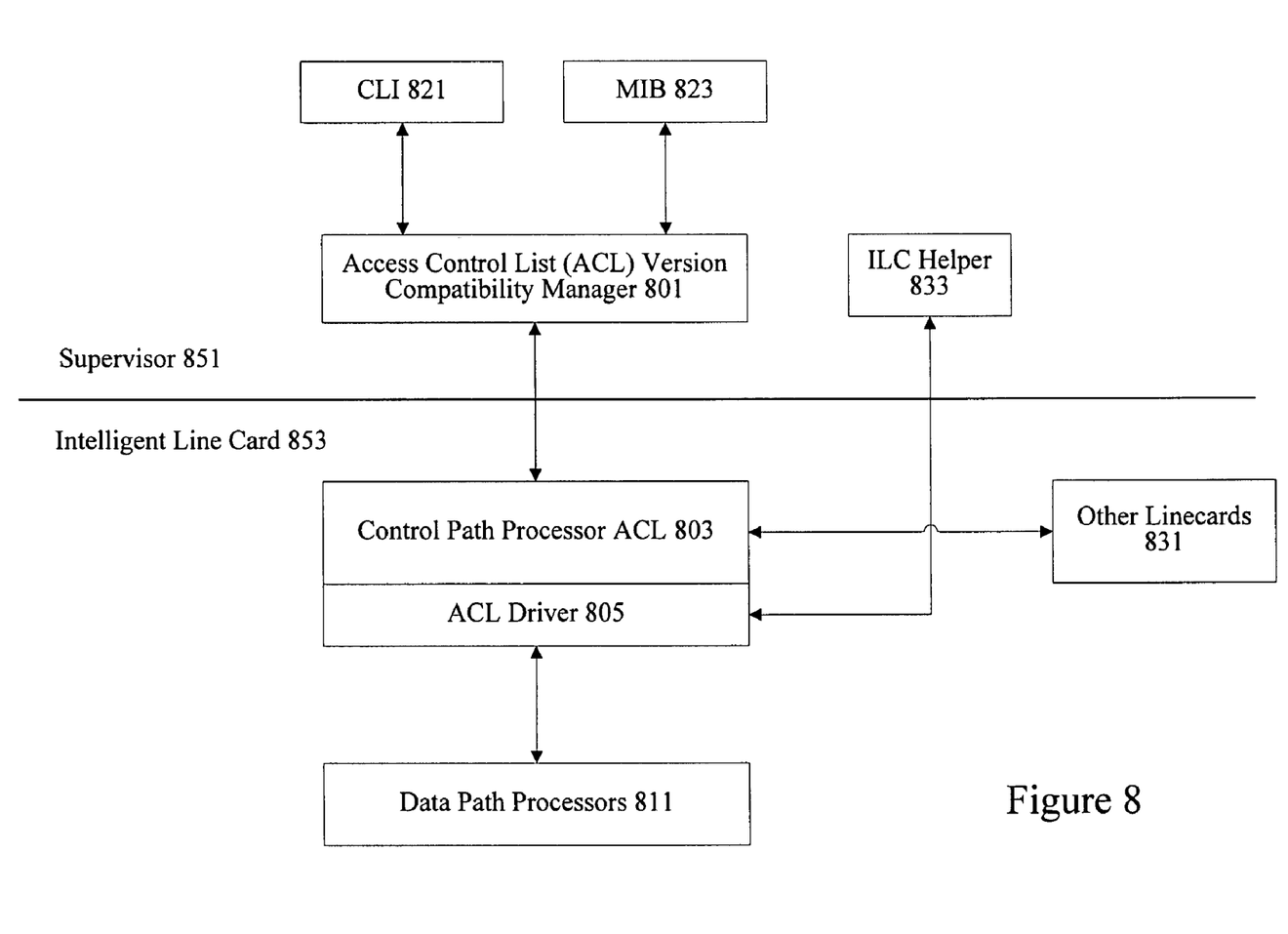
FIG. 8 is a diagrammatic representation showing a version control checking mechanism.

FIG. 8 is a diagrammatic representation showing a system for implementing access control lists to maintain version compatibility. According to various embodiments, a CLI handler 821 is used to make calls to an Access Control List (ACL) Version Compatibility Manager 801 to allow version compatibility checks on a port or linecard basis. According to various embodiments, a CLI 821, a management information base (MIB) 823, an ACL Version Compatibility Manager 801, and an Intelligent Line Card (ILC) Helper 833 are all associated with a supervisor 851. A Control Path Processor ACL 803, an ACL Driver 805, and data path processors 811 are all associated with an intelligent line card 853. The intelligent line card 853 can be connected to other line cards 831.

According to various embodiments, a message is sent from the ACL Version Compatibility Manager 801 to the CPP ACL 803. The CPP ACL 803 creates data structures to handle incoming packets, allows version checks for incoming packets, and allows version checks for outgoing packets. The ACL Driver 805 sends messages to data path processors (DPP) 811 to update the DPP data structures. The DPP 811 send back an acknowledgment for the control messages. The ACL Driver 805 responds to the call made by the CPP ACL Manager 803 and the CPP ACL Manager 803 makes calls to update the supervisor 851 and the ACL Driver 805 sends an MTS message to the ILC Helper 833 process on the supervisor 833. The ILC Helper 833 process stores the data structures and sends a response MTS message to the CPP 803. The ACL Driver 805 responds to the call made by the CPP ACL Manager 803. CPP ACL Manager 803 sends a response MTS message to the ACL Version Compatibility Manager 801 on the supervisor 851. The ACL Version Compatibility Manager 801 responds to the CLI 821 call.

Figure 9:
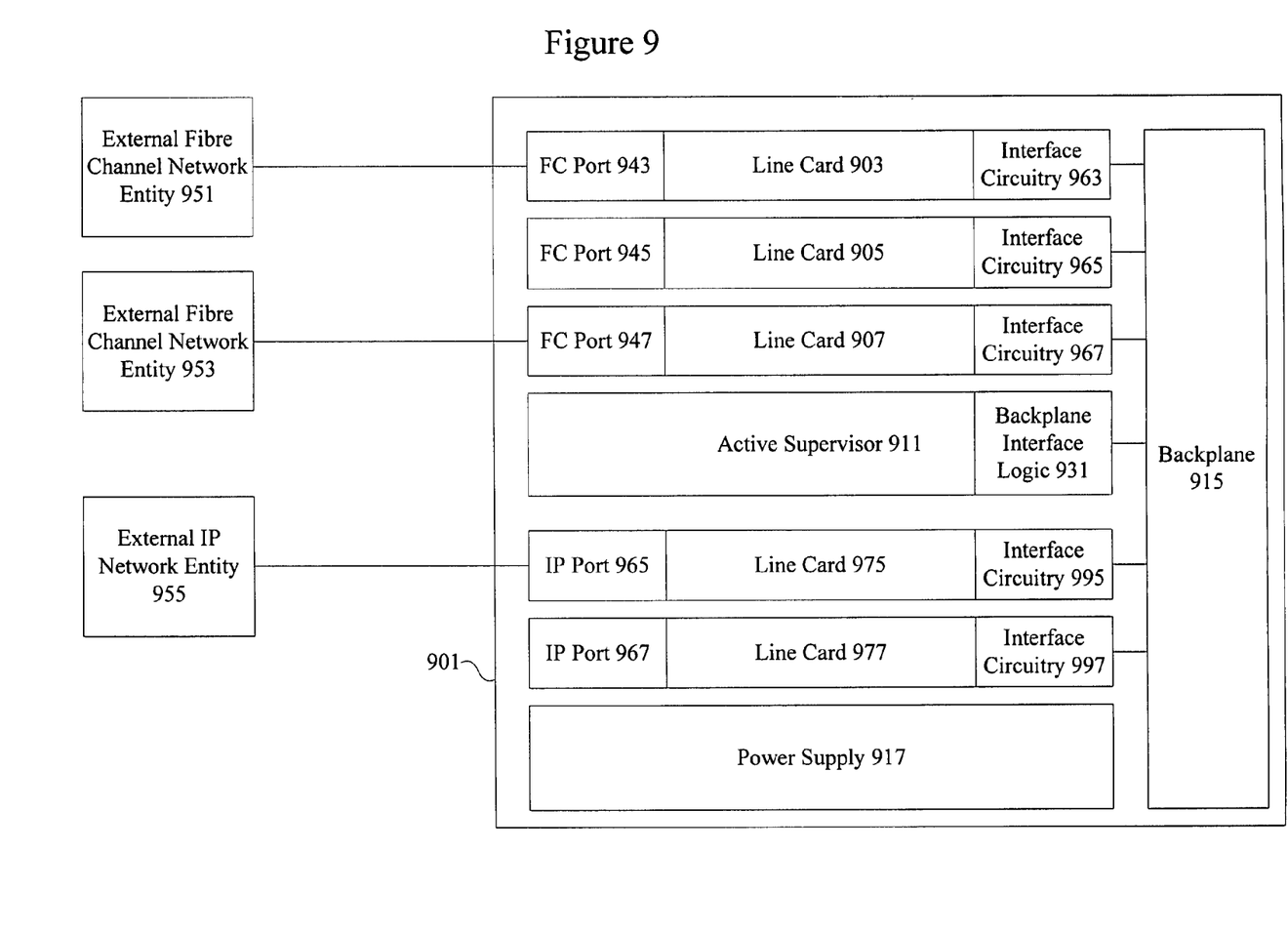
FIG. 9 is a diagrammatic representation showing one example of a fibre channel switch.

FIG. 9 is a diagrammatic representation of one example of a fibre channel switch that can use the techniques of the present invention. Although one particular configuration will be described, it should be noted that a wide variety of switch, router, line card, and component configurations are available. The switch 901 may include one or more supervisors 911. According to various embodiments, the supervisor 911 has its own processor, memory, and storage resources and includes a number of images.

Line cards 903, 905, and 907 can communicate with an active supervisor 911 through interface circuitry 983, 985, and 987 and the backplane 915. According to various embodiments, the line cards 903, 905, and 907 are intelligent with data snooping, data path processing, and control path processing capabilities. According to various embodiments, each line card includes a plurality of ports that can act as either input ports or output ports for communication with external fibre channel network entities 951 and 953. The backplane 915 can provide a communications channel for all traffic between line cards and supervisors. Individual line cards 903 and 907 can also be coupled to external fibre channel network entities 951 and 953 through fibre channel ports 943 and 947.

External fibre channel network entities 951 and 953 can be nodes such as other fibre channel switches, disks, RAIDS, tape libraries, or servers. It should be noted that the switch can support any number of line cards and supervisors. In the embodiment shown, only a single supervisor is connected to the backplane 915 and the single supervisor communicates with many different line cards. The active supervisor 911 may be configured or designed to run a plurality of applications such as routing, domain manager, system manager, and utility applications.

According to one embodiment, the routing application is configured to provide credits to a sender upon recognizing that a frame has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

According to various embodiments, the switch also includes line cards 975 and 977 with IP interfaces 965 and 967. In one example, the IP port 965 is coupled to an external IP network entity 955. The line cards 975 and 977 can also be coupled to the backplane 915 through interface circuitry 995 and 997.

According to various embodiments, the switch can have a single IP port and a single fibre channel port. In one embodiment, two fibre channel switches used to form an FCIP tunnel each have one fibre channel line card and one IP line card. Each fibre channel line card connects to an external fibre channel network entity and each IP line card connects to a shared IP network.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for performing version compatibility checking, the method comprising:
   identifying prior version interface files associated with a prior version code base;
   identifying updated version interface files associated with an updated version code base;
   identifying tokens associated with the prior version interface files and tokens associated with updated version interface files;
   inserting compatibility information into updated version code base image headers configured for installation on network device line cards;
   generating Access Control Lists (ACLs) using the compatibility information included in updated version code base image headers;
   confirming compatibility at compile time, at install time, and a run time, wherein compatibility between the prior version code base and the updated version code base is confirmed at install time upon determining that structures and functions included in the tokens associated with the prior version interface files correspond to structures and functions included in the tokens associated with updated version interface files, wherein compatibility is confirmed at install time by checking compatibility information included in updated version code base image headers, and wherein compatibility is confirmed at run time by blocking traffic between line cards not identified as compatible by the ACLs.

2. The method of claim 1, wherein tokens include structures, unions, variables, functions, and macros.

3. The method of claim 1, wherein the updated version code base is compiled for installation as an image on a network device, the image associated with a component of the network device.

4. The method of claim 3, wherein the component is an intelligent line card.

5. The method of claim 3, wherein the intelligent line card includes multiple images.

6. The method of claim 1, further comprising generating a compatibility matrix upon confirming compatibility.

7. The method of claim 6, wherein the compatibility matrix is used to generate Access Control Lists (ACLs).

8. The method of claim 7, wherein the ACLs are used to enforce image compatibility at run time.

9. The method of claim 8, wherein the ACLs only allow traffic between linecards that are running compatible images.

10. The method of claim 8, wherein the ACLs only allow traffic between appliances that are running compatible images.

11. A system for performing version compatibility checking, the system comprising:
   an interface operable to receive prior version interface files associated with a prior version code base and receive updated version interface files associated with an updated version code base;
   a processor operable to identifying tokens associated with the prior version interface files and tokens associated with updated version interface files, insert compatibility information into updated version code base image headers configured for installation on network device line cards, and generate Access Control Lists (ACLs) using the compatibility information included in updated version code base image headers, wherein the processor is configured to confirm compatibility at compile time, at install time, and a run time, wherein compatibility between the prior version code base and the updated version code base is confirmed at install time upon determining that structures and functions included in the tokens associated with the prior version interface files correspond to structures and functions included in the tokens associated with updated version interface files, wherein compatibility is confirmed at install time by checking compatibility information included in updated version code base image headers, and wherein compatibility is confirmed at run time by blocking traffic between line cards not identified as compatible by the ACLs.

12. The system of claim 11, wherein tokens include structures, unions, variables, functions, and macros.

13. The system of claim 11, wherein the updated version code base is compiled for installation as an image on a network device, the image associated with a component of the network device.

14. The system of claim 13, wherein the component is a line card.

15. The system of claim 13, wherein the component is an intelligent line card.

16. The system of claim 13, wherein the intelligent line card includes multiple images.

17. The system of claim 11, further comprising generating a compatibility matrix upon confirming compatibility.

18. The system of claim 17, wherein the compatibility matrix is used to generate Access Control Lists (ACLs).

19. The system of claim 18, wherein the ACLs are used to enforce image compatibility at run time.

20. The system of claim 19, wherein the ACLs only allow traffic between linecards that are running compatible images.

21. The system of claim 19, wherein the ACLs only allow traffic between appliances that are running compatible images.

22. An apparatus for performing version compatibility checking, the apparatus comprising:
   means for identifying prior version interface files associated with a prior version code base;
   means for identifying updated version interface files associated with an updated version code base;
   means for identifying tokens associated with the prior version interface files and tokens associated with updated version interface files;
   means for inserting compatibility information into updated version code base image headers configured for installation on network device line cards;
   means for generating Access Control Lists (ACLs) using the compatibility information included in updated version code base image headers;
   means for confirming compatibility at compile time, at install time, and a run time, wherein compatibility between the prior version code base and the updated version code base is confirmed at install time upon determining that structures and functions included in the tokens associated with the prior version interface files correspond to structures and functions included in the tokens associated with updated version interface files, wherein compatibility is confirmed at install time by checking compatibility information included in updated version code base image headers, and wherein compatibility is confirmed at run time by blocking traffic between line cards not identified as compatible by the ACLs.

23. The apparatus of claim 22, wherein tokens include structures, unions, variables, functions, and macros.

24. The apparatus of claim 22, wherein the updated version code base is compiled for installation as an image on a network device, the image associated with a component of the network device.

25. The apparatus of claim 24, wherein the component is a line card.

26. The apparatus of claim 24, wherein the component is an intelligent line card.

27. The apparatus of claim 24, wherein the intelligent line card includes multiple images.

28. The apparatus of claim 22, further comprising means for generating a compatibility matrix upon confirming compatibility.

29. The Apparatus of claim 28, wherein the compatibility matrix is used to generate Access Control Lists (ACLs).

* * * * *